(12) United States Patent
Price et al.

(10) Patent No.: US 7,650,397 B2
(45) Date of Patent: *Jan. 19, 2010

(54) PLUG-IN CONFIGURATION MANAGER

(75) Inventors: Adrian Price, Worthing (GB); Sean Garagan, Lake Echo (CA)

(73) Assignee: BEA Systems, Inc., Redwood Shores, CA (US)

( * ) Notice: Subject to any disclaimer, the term of this patent is extended or adjusted under 35 U.S.C. 154(b) by 489 days.

This patent is subject to a terminal disclaimer.

(21) Appl. No.: 10/425,920

(22) Filed: Apr. 29, 2003

(65) Prior Publication Data

US 2004/0073782 A1    Apr. 15, 2004

Related U.S. Application Data

(60) Provisional application No. 60/377,341, filed on May 2, 2002.

(51) Int. Cl.
*G06F 15/177* (2006.01)
(52) U.S. Cl. .................. 709/221; 709/220; 709/222; 717/100; 717/108; 713/1
(58) Field of Classification Search .......... 709/221–222; 713/1; 717/100, 108, 168
See application file for complete search history.

(56) References Cited

U.S. PATENT DOCUMENTS

| | | | |
|---|---|---|---|
| 5,933,646 A | 8/1999 | Hendrickson et al. | 395/712 |
| 6,173,420 B1 * | 1/2001 | Sunkara et al. | 714/38 |
| 6,230,318 B1 * | 5/2001 | Halstead et al. | 717/108 |
| 6,243,773 B1 * | 6/2001 | Mahalingam | 710/302 |
| 6,336,134 B1 * | 1/2002 | Varma | 709/205 |
| 6,363,421 B2 * | 3/2002 | Barker et al. | 709/223 |
| 6,363,497 B1 * | 3/2002 | Chrabaszcz | 714/13 |
| 6,560,606 B1 | 5/2003 | Young | 707/101 |
| 6,725,261 B1 * | 4/2004 | Novaes et al. | 709/220 |
| 6,769,008 B1 * | 7/2004 | Kumar et al. | 709/201 |
| 6,898,204 B2 * | 5/2005 | Trachewsky et al. | 370/445 |
| 6,920,474 B2 * | 7/2005 | Walsh et al. | 709/200 |
| 6,983,324 B1 * | 1/2006 | Block et al. | 709/228 |
| 7,065,566 B2 * | 6/2006 | Menard et al. | 709/223 |
| 2002/0046301 A1 * | 4/2002 | Shannon et al. | 709/328 |

FOREIGN PATENT DOCUMENTS

EP    1 267 263 A2    12/2002

* cited by examiner

*Primary Examiner*—William C Vaughan, Jr.
*Assistant Examiner*—Mohamed Ibrahim
(74) *Attorney, Agent, or Firm*—Fliesler Meyer LLP

(57) ABSTRACT

In an embodiment, plug-in information can be synchronized on each node in a cluster by utilizing a migratable plug-in configuration manager and a migratable global MBean. The configuration manager can change the configuration on a master server, such as loading or unloading a plug-in. The configuration manager stores the configuration as an MBean attribute, which is accessible across the cluster. The configuration manager can direct the global MBean to notify a plug-in manager on each node in the cluster, whereby each plug-in manager can execute the change locally.

17 Claims, 4 Drawing Sheets

PLUG-IN CONFIGURATION MANAGER

CLAIM OF PRIORITY

This application claims priority to U.S. Provisional Patent Application No. 60/377,341, filed May 2, 2002, entitled "PLUG-IN CONFIGURATION MANAGER," which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. patent application Ser. No. 10/404,552 filed Apr. 1, 2003 to Michael Blevins and entitled, "COLLABORATIVE BUSINESS PLUG-IN FRAMEWORK";

U.S. patent application Ser. No. 10/404,684 filed Apr. 1, 2003 to Michael Blevins and entitled, "SYSTEMS AND METHODS FOR BUSINESS PROCESS PLUG-IN DEVELOPMENT"; and U.S. patent application Ser. No. 10/404,296 filed Apr. 1, 2003 to Michael Blevins and entitled, "SYSTEM AND METHOD FOR COLLABORATIVE BUSINESS PLUG-INS".

FIELD OF THE INVENTION

The present invention relates to the synchronized configuration of plug-ins on servers in a cluster.

BACKGROUND

In existing business process management (BPM) systems, flaws exist in the mechanisms used to propagate the actual runtime space of a plug-in manager across a cluster. Plug-ins on the cluster do not each experience the same life cycle. A plug-in configuration manager, such as a singleton stateless session bean, is typically pinned to a single server in the cluster. The configuration manager maintains the state of all plug-ins configured within a BPM system, and any configuration changes can be propagated from this manager to any other server in the BPM system. Since the configuration manager is held on a single server in the cluster, however, the configuration manager represents a single point of failure within the application.

BRIEF SUMMARY

Systems and methods in accordance with embodiments of the present invention can be used to manage the configuration of plug-ins across a cluster. A global management JavaBean (MBean) can be used to store the current plug-in information for the cluster as an attribute of the MBean. The global MBean can thereby provide cluster-wide access to this attribute, and can broadcast changes to the configuration as notifications to each server in the cluster. A plug-in manager can reside on each server in the cluster, and can have a notification listener capable of receiving the notifications from the global MBean. Each plug-in manager can execute the configuration changes on the server containing the plug-in manager in response to a notification.

A plug-in manager can exist once in a cluster, which can first execute a change to the current plug-in configuration, such as on a master server, and can direct the global MBean to broadcast the change to each plug-in manager. The global MBean and plug-in configuration manager can be migratable throughout the cluster. A persistent data store can be used to hold plug-in configuration information that the global MBean can use if the global MBean needs to obtain state information, such as when a new MBean is created. Changes executed by the plug-in configuration manager can include the loading, unloading and configuration of plug-ins.

Other features, aspects, and objects of the invention can be obtained from a review of the specification, the figures, and the claims.

DETAILED DESCRIPTION

Systems and methods in accordance with embodiments of the present invention can utilize a plug-in framework to design, execute, and monitor business processes, as well as to administer related data with an integration system. Components of such a framework, which can be provided by an integration system, for example, can include components such as a process engine or business process management (BPM) server, an integration studio or design client, and a worklist or run-time management client.

Figure 1:
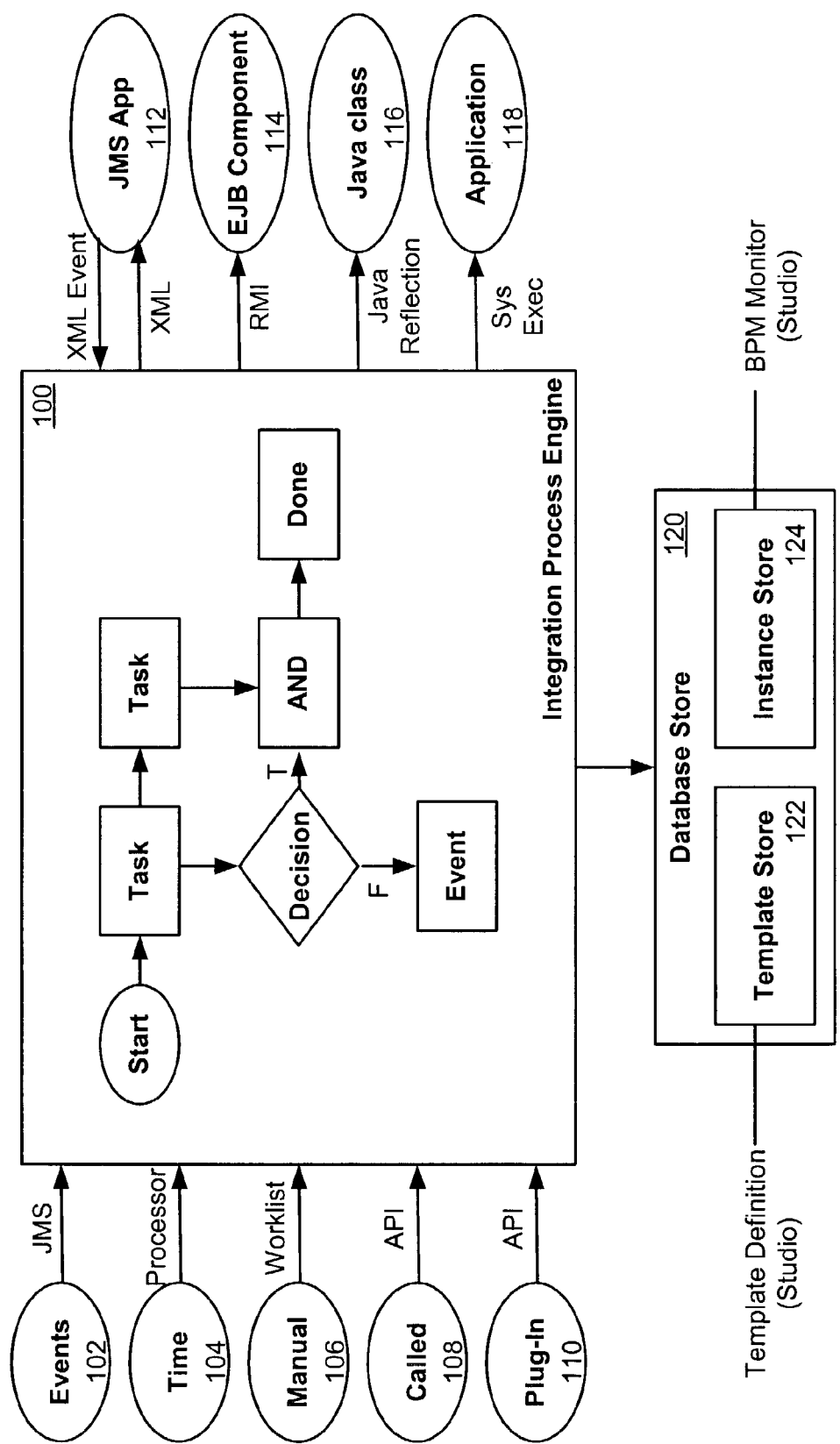
FIG. 1 is a diagram of a business processing model that can be used in accordance with one embodiment of the present invention.

In addition to design and run-time management clients, a user can create custom clients to manage business processes, and/or enhance an existing set of user interface features using a BPM API. A BPM API can be used to create custom configuration, design, run-time management, and monitoring clients. FIG. 1 illustrates an exemplary BPM processing model that can be used in accordance with one embodiment of the present invention.

Such a BPM processing model can depend on the integration process engine 100, which serves as the controller for run-time instances, managing the execution and monitoring the progress of those instances. Certain methods can allow a user to start, or instantiate, a business process and interact with an existing business process. Such methods can include methods called: in response to an XML event 102, as a time-based event 104, through a manual call 106, through a call from another business process 108, or through a plug-in interface 110.

Certain entities can be integrated into a business process, such as a JMS application 112, EJB component 114, Java class 116, or another application 118. The database store 120 stores templates, template definitions, and run-time instances, such as in a template store 122 or instance store 124. A user can create templates and template definitions, and can monitor run-time instances using a studio or custom design client.

Figure 2:
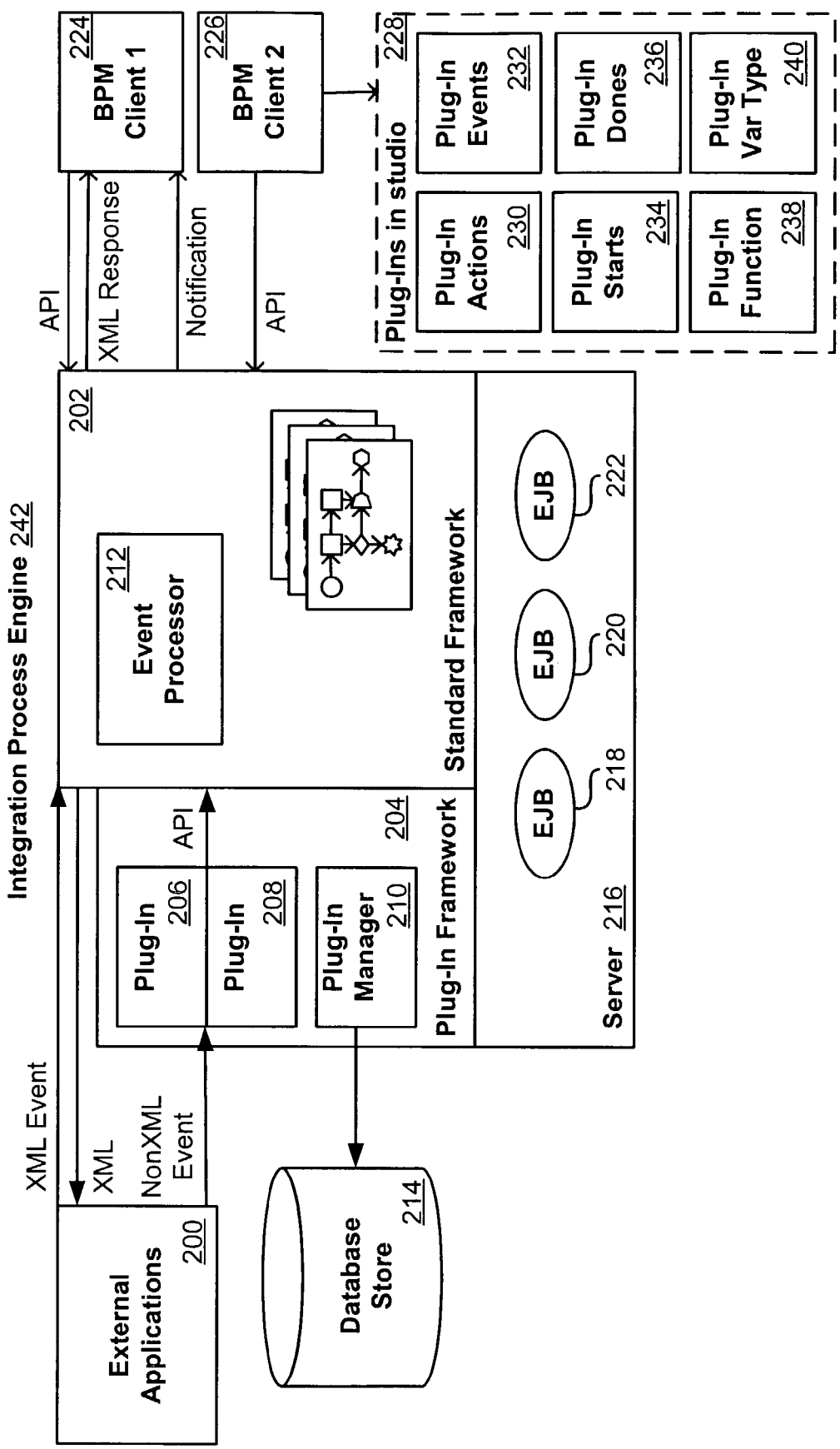
FIG. 2 is a diagram of a plug-in framework that can be used with the processing model of FIG. 1.

FIG. 2 illustrates an exemplary BPM plug-in framework 204 that can be used within the overall BPM architecture. A server 216, which can include EJBs 218, 220, 222, can manage the deployment of the BPM and plug-in EJBs 206, 208. To make a plug-in available to BPM users, the user can simply deploy the plug-in as a session EJB on the server. The plug-in can be deployed as part of the integration application, such as by editing the config.xml file. A BPM plug-in manager 210 can store plug-in configuration information in an integration database store 214. An external application 200 can interact with the process engine via an XML event or nonXML event. NonXML events can be supported via the plug-in framework 204. An event processor 212, which can be part of a standard framework 202, can manage both XML and non-XML events.

The main components of a plug-in framework 204 can include a plug-in manager 210, which supports the management of plug-ins 206, 208 and a plug-in API, which supports the design and development of plug-ins. The plug-in manager 210 can be a dedicated part of an integration process engine 242 that supports the configuration, design, and run-time management of plug-ins. The plug-in manager 210 can oversee the loaded plug-ins and their interactions with the integration process engine and BPM clients 224, 226, and can route all plug-in related requests. Requests can be routed to plug-ins in the studio 228. The studio 228 can contain plug-ins to handle, for example, plug-in functions 230, plug-in events 232, plug-in starts 234, plug-in dones 236, plug-in functions 238, and plug-in variable types 240.

An integration process engine can run on a platform, such as WebLogic Server from BEA Systems of San Jose, Calif., and can take advantage of services such as J2EE-compliant services. One such service that can be used by BPM is an Enterprise JavaBean (EJB). An EJB can provide lifecycle management and services such as caching, persistence, and transaction management. The process engine can consist of a combination of session and entity EJBs. In addition, message-driven beans can be used for providing asynchronous messaging services. A plug-in framework can support the development and deployment of plug-ins into a system.

A plug-in can consist of a set of run-time loadable Java classes that can extend system functionality, such as the business process management functionality of an integration system. Developers can use a plug-in framework to integrate other products and technologies into the integration environment. Developers can also use plug-ins to modify the default design-time or run-time behavior of workflow components.

A plug-in API can be used to provide support for configuration, design, and run-time interactions between a process engine and a deployed plug-in. An exemplary plug-in API can consist of two session EJBs, a set of run-time management classes, and a package. A plug-in manager can be a stateless session EJB that provides run-time management of plug-ins. A plug-in manager can provide meta-data about the deployed plug-ins, enable access to plug-in design and run-time components, and handle event notifications to and from plug-ins.

A plug-in manager configuration EJB can also be used, which can be a stateless session EJB that provides configuration and design management of plug-ins. Such an EJB can maintain plug-in configuration information, manage the plug-in framework cluster-wide state transitions, and maintain a list of plug-ins that are registered for the system event notifications. Plug-in classes can also be used to provide run-time management of plug-ins during workflow execution. A common plug-in package can provide client and process engine functions, including value object classes. All members of this package can be serializable to allow for exchanges between the client and process engine.

A session bean can go through various stages during a life cycle, which can be managed by a bean container, for example. The life cycle of a bean can be useful for managing resources such as database connections. A client or application can initiate a life cycle by invoking a 'create' method on the container, which can instantiate the bean and invoke the necessary methods in the session bean, making the bean ready to have its business methods invoked. The container can passivate a bean by moving it from memory to a secondary storage. If a client invokes a business method on the bean while the bean in a passive stage, the container can reactivate the bean, returning the bean to a ready state. At the end of a life cycle, the client can invoke certain methods on the container. An ejbCreate method, for example, can be used to perform certain operations after a bean is instantiated, such as connecting to a database. Because presently a stateless session bean is never passivated, its life cycle can have just two stages, including 'non-existent' and 'ready.'

A Common Management Model (COMMO) framework can be used to implement this functionality. COMMO provides the ability for one node on the cluster to effect a change in a configuration, and to broadcast a notification of that change to every other node on the cluster. The other nodes on the cluster can then replicate the change, performing the same operation locally. In other words, there can be a master server that allows for the loading and unloading of plug-ins, as well as the reconfiguration of these plug-ins. This work can be first accomplished on the master server, then replicated out on the other servers in the cluster. The master server can be either a designated server in the cluster, or can simply be the server that first received the request to change state. In the latter case, the master and managed servers can change for each request.

A COMMO framework can provide the ability to store the current configuration as an attribute of a global MBean. Systems and methods in accordance with embodiments of the present invention can utilize a Management JavaBean, or MBean, to ensure that nodes in a cluster are synchronized. An MBean can be the instrumentation of a resource in compliance with the Java Management eXtensions (JMX) specification, as set forth by Sun Microsystems of Santa Clara, Calif. A resource such as a Java application can be its own MBean, while an MBean can be thought of as a Java "wrapper" or Java representation of other resources or devices. When the nodes are synchronized, anything that happens to one of the plug-ins can happen to the other plug-ins at the same time, or at approximately the same time. While this benefit might not be apparent to an end user, there is certainly a benefit to somebody developing a plug-in as the developer can depend upon a life cycle. A global MBean can be accessible directly to any new servers that join the cluster, as well as to any existing servers that may need to obtain state information. COMMO can also be used to provide the ability to broadcast a notification of a state change.

In present systems the life cycle is different, as a singleton stateless session bean can be used to function as the plug-in configuration manager. The stateless session bean can be pinned to a single server in the cluster. In accordance with certain embodiments of the present invention, the responsibility for propagating the state changes can be designated to the plug-ins and plug-in managers themselves. This approach would not have worked in present systems, as present systems lack the underlying facilities to support such an approach. This has not been a major issue for present systems, as most components have not been clusterable. Now that all components can be clusterable, it can be desirable, and in some instances necessary, to change the way in which the system works.

A JMX notification listener can be part of each plug-in manager. Each server that enters a cluster can locate the global MBean that will provide the server with the current plug-in configuration. The global MBean can also provide the server with notification state changes. A notification listener can be implemented using a COMMO framework, with the system acting as a client to that service.

Figure 3:
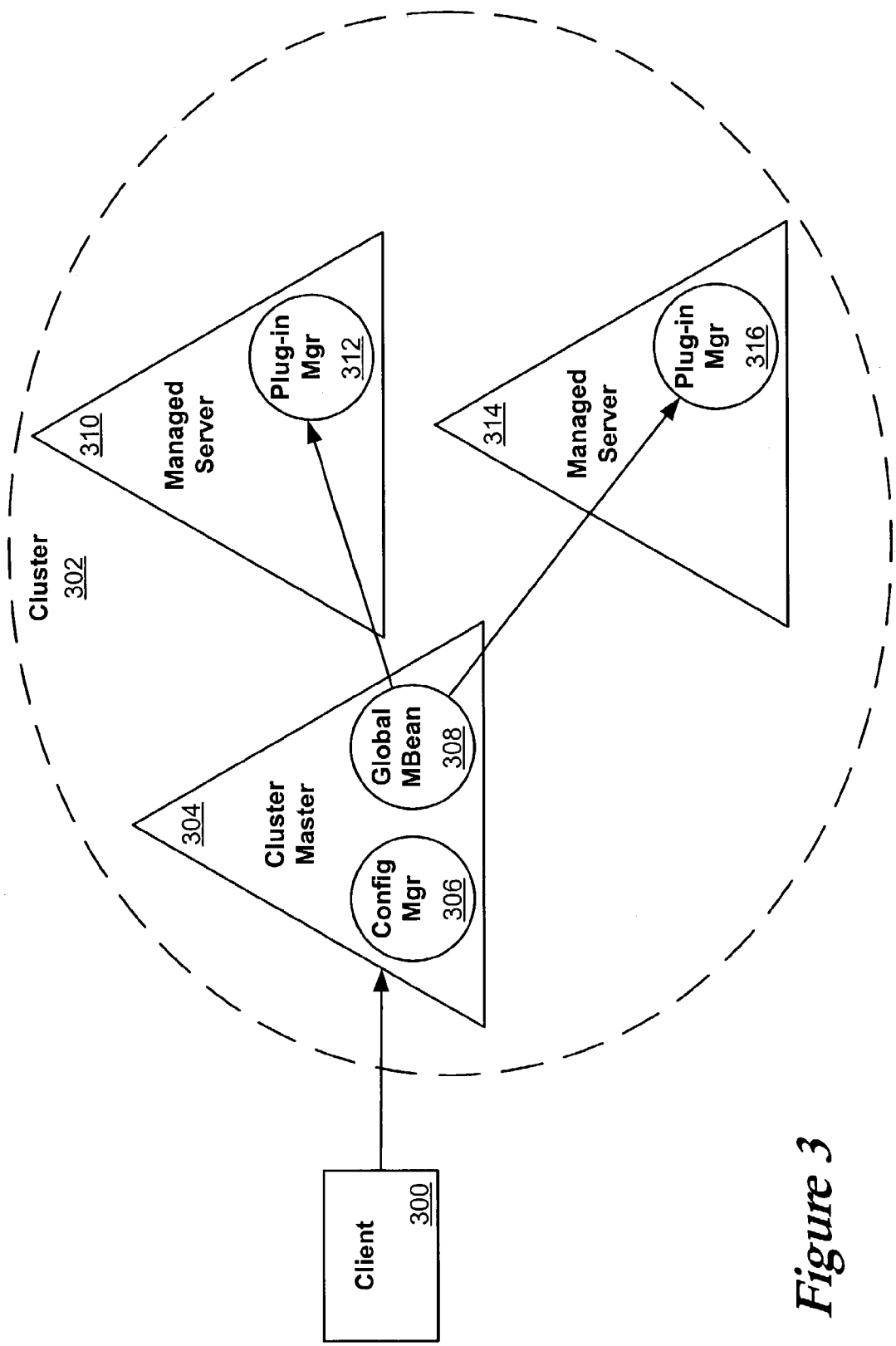
FIG. 3 is a diagram of a clustered approach that can be used with the model of FIG. 1.

The service can enable the plug-in configuration manager to make a remote call to each of the other managed servers. This call can be described, for example, in regard to the system of FIG. 3. A client 300 can make a request for state change into the cluster 302, which can be received by a master server 304. The master server can be a designated cluster master, or can simply be the server that receives the request. A plug-in configuration manager 306 can direct the change to occur on the master server 304, which change can consist of the loading, unloading, or configuration of a plug-in. The configuration manager 306 can then direct the global MBean 308 to update the state in the MBean attribute holding the plug-in configuration state.

The plug-in configuration manager 306 and global MBean 308 can be migratable MBeans that can exist on any node in the cluster. The plug-in configuration manager 306 can direct the global MBean 308 to broadcast a notification of the change to each managed server 310, 314 in the cluster 302. This call can inform the other servers that a plug-in has been loaded, unloaded, or reconfigured, for example. When the managed servers 310, 314 receive such a notification, the servers can each execute the same command locally. This local execution can be directed by a plug-in manager 312, 316 on each server. This approach can help to keep the plug-ins synchronized on each of the servers.

From the point of view of services that are available to the clients of the cluster, the cluster is homogeneous and each node is equivalent. This synchronization can be guaranteed. If there is a communications error or system failure, for example, the framework can continue to attempt to notify the servers. As long as the servers are running and available, the nodes can remain synchronized. If a managed server goes down and comes back up, such an MBean framework can provide the functionality for the server to re-synchronize, such that the server will be completely in step with the other servers.

Figure 4:
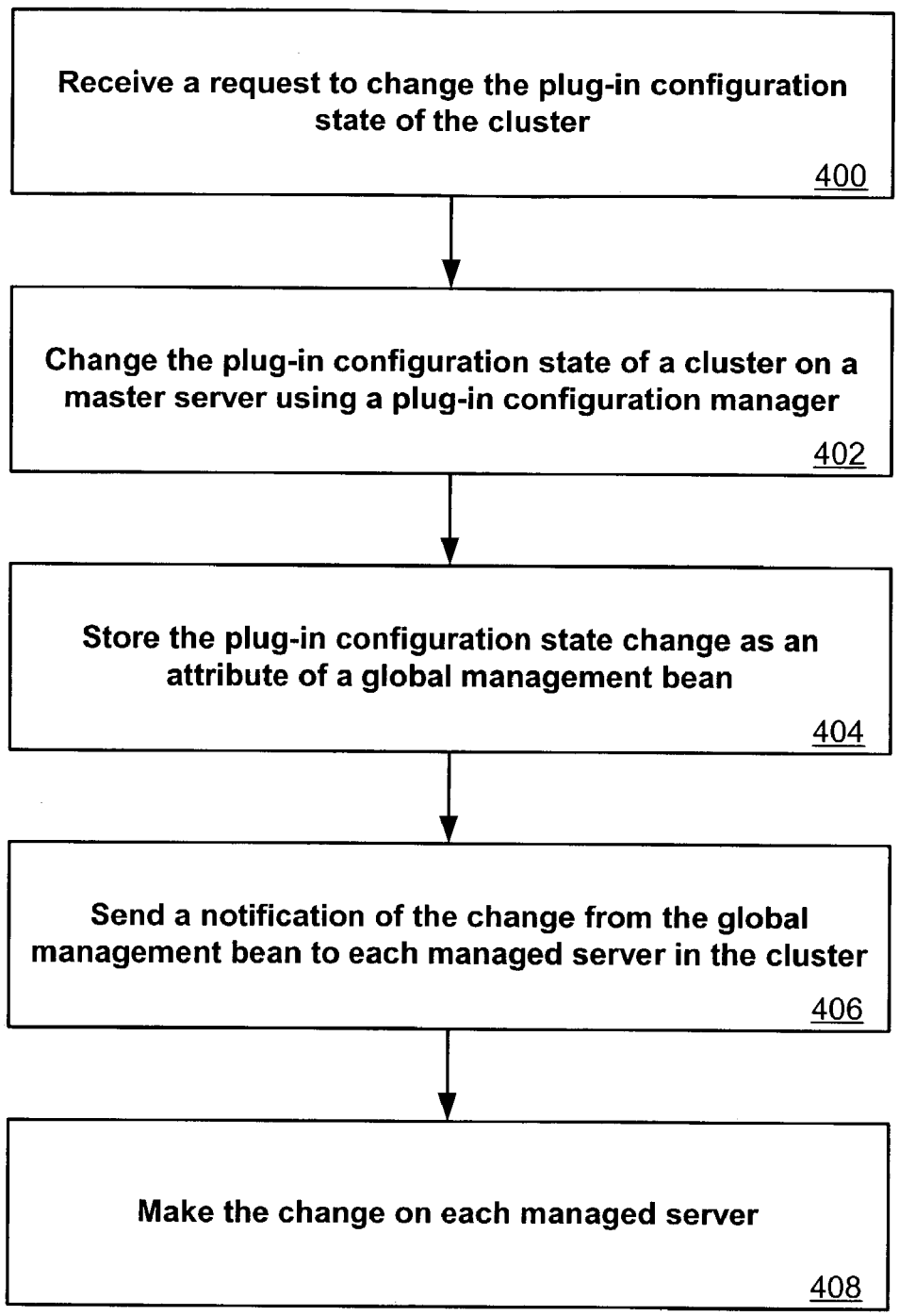
FIG. 4 is flowchart for a method that can be used with the approach of FIG. 3.

The broadcast that goes out for a failed node does not have to include a history of state changes. Rather than retrieving all the lost notifications in sequence, it is possible to simply retrieve the current state in a single call. This single notification can also be used for a node that is just joining the cluster. An approach that can be used in such a situation is shown in FIG. 4. A request can be received, such as from a client, to change the plug-in configuration state of the cluster 400. The plug-in configuration can be changed on a master server in the cluster using a plug-in configuration manager 402. The configuration state change can be stored as an attribute of a global management bean, such as may be resident on the cluster master 404. A notification, which can contain any of the change-related information discussed above, can be broadcast from the global management bean to each managed server in the cluster 406. The global management bean can be aware of any new servers being added to the cluster that should receive notifications. The configuration change can then be made on each managed server, such as by the plug-in manager on each server 408. If a new server is brought into the cluster, the notification that is broadcast can contain the entire configuration state instead of just the change. Alternatively, a separate notification can be sent to the new server that contains the entire configuration.

In systems and methods in accordance with one embodiment, JMX can be used to write the plug-in configuration manager as an MBean that can implement a specific interface and conform to certain design patterns. Since an MBean is being used, the server can become responsible for the propagation of changes. The configuration manager can also be designated as a run-once service. This designation can allow for automatic fail-over in the case of a crash, and can ensure that only a single version of the configuration manager exists in the cluster. The existence of a single configuration manager can prevent inconsistent states between servers.

Using such a COMMO MBean framework, a new non-persistent MBean can be defined that can maintain the cluster-wide plug-in and plug-in manager state, and can broadcast delta notifications to all managed servers whenever the state changes. The state itself can be held in a single object, such as a 'PluginManagerState' object, and can be available from the MBean via a 'PluginManagerState' attribute. The state can describe which plugins are currently loaded, as well as the configuration data for these plug-ins.

When a managed server boots, the server can create an MBean if one does not already exist, retrieving the static plugin configuration from a persistent store, such as through JDBC, and setting a state attribute such as "PluginManagerState" for the MBean. If the MBean already exists, the managed server can connect to the existing MBean and retrieve the dynamic plug-in configuration. In either case, the MBean can register as a JMX notification listener with a local MBean server. The server can then load the same plug-ins as are loaded on the other nodes in the cluster, using the same plug-in configuration data.

A plugin configuration manager bean, such as "PluginManagerCfg", can still be pinned to a single node of the cluster, but can be implemented as a migratable service. This bean can support dynamically changing the plugin configuration, including changes such as loading a plug-in, unloading a plug-in, setting the configuration for a plug-in, and deleting the configuration for a plug-in.

After servicing any of the above requests, the plugin configuration manager can call the MBean to broadcast, to the other nodes in the cluster, a JMX notification containing the delta. The notification can contain the entire state or simply the change of state. Upon receiving a notification, the plug-in manager on each server can follow suit and execute the same configuration command locally. Thus, plug-ins can maintain an identical state and configuration on all servers. JMX notifications can be propagated synchronously.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system, comprising:

a business process management framework for managing plug-ins across a cluster of servers, comprising:

a global management bean, wherein the global management bean is migratable throughout the cluster of servers and stores plug-in configuration for the cluster of servers;

a plurality of plug-in managers, wherein each plug-in manager resides on one of the cluster of servers, each plug-in manager receiving configuration change notifications from the global management bean and executing the configuration change on the server containing that plug-in manager, and wherein the plug-in manager oversees the interaction between plug-ins and an existing business process;

a plug-in configuration manager existing in one of the cluster of servers, wherein the plug-in configuration manager is migratable throughout the cluster of servers, and wherein the plug-in configuration manager updates the plug-in configuration stored by the global management bean and directs the global management bean to broadcast a configuration change notification to each plug-in manager to execute a change selected from the group consisting of loading, unloading, and reconfiguring plug-ins across the cluster of servers.

2. A system according to claim 1, wherein:

the global management bean stores the plug-in configuration as an attribute of the management bean and the global management bean allows cluster-wide access to the attribute.

3. A system according to claim 1, wherein:

each plug-in manager has a notification listener for receiving notifications from the global management bean.

4. A system according to claim 1, wherein:

each plug-in manager requests the current plug-in configuration from the global management bean.

5. A system according to claim 1, further comprising:

a master server in the cluster allows for a change in the plug-in configuration on the master server before the same change is is applied to other servers in the cluster.

6. A system according to claim 1, wherein:

the global management bean broadcasts a configuration change notification to each server in the cluster, the notification containing only the change to the plug-in configuration for the cluster.

7. A system according to claim 1, further comprising:

a state object stores plug-in configuration state for the global management bean.

8. A method for managing plug-ins across a cluster of servers, comprising:

receiving a request to change plug-in configuration state of the cluster of servers;

changing a plug-in configuration state of the cluster of servers on a master server using a plug-in configuration manager;

storing the plug-in configuration state change as an attribute of a global management bean, wherein the global management bean is migratable throughout the cluster of servers and stores plug-in configuration for the cluster of servers;

sending a notification of the change from the global management bean to each managed server in the cluster servers, wherein each server in the cluster of servers is associated with a business process management plug-in manager, wherein the business process management plug-in manager oversees the interaction between plug-ins and an existing business process; and making the change on each managed server in the cluster of servers.

9. The system of claim 1, wherein the plug-in manager is a stateless session bean that provides run-time management of plug-ins.

10. The system of claim 1, wherein the plug-in manager provides metadata about deployed plug-ins, enables access to plug-in design and run-time components, and handles event notifications to and from plug-ins.

11. The system of claim 1, wherein a plug-in API provides support for configuration, design, and run-time interactions between a process engine and a deployed plug-in.

12. The system of claim 1, wherein a configuration management plug-in is a stateless session bean that maintains plug-in configuration information, manages the plug-in framework cluster-wide state transitions, and maintains a list of plug-ins that are registered for event notifications.

13. The system of claim 1, wherein the plug-in configuration manager is designated as a run-once service.

14. The system of claim 13, wherein designation as a run-once service allows for automatic fail-over and ensures that only a single version of the plug-in configuration manager exists in the cluster of servers.

15. The system of claim 13, wherein a single plug-in configuration manager in the cluster of servers prevents inconsistent states between servers in the cluster of servers.

16. A system according to claim 1, wherein the plug-in configuration manager keeps the plug-ins synchronized on each of the servers in the cluster.

17. A system according to claim 1, wherein at least one of the plug-ins handles one or more external events.

* * * * *

UNITED STATES PATENT AND TRADEMARK OFFICE
CERTIFICATE OF CORRECTION

| | | |
|---|---|---|
| PATENT NO. | : 7,650,397 B2 | |
| APPLICATION NO. | : 10/425920 | |
| DATED | : January 19, 2010 | |
| INVENTOR(S) | : Adrian Price et al. | |

It is certified that error appears in the above-identified patent and that said Letters Patent is hereby corrected as shown below:

In column 7, line 33, in claim 2, delete "management bean" and insert -- global management bean --, therefor.

In column 7, line 47, in claim 5, delete "is is" and insert -- is --, therefor.

In column 7, line 52, in claim 6, after "containing" delete "only".

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,650,397 B2  Page 1 of 1
APPLICATION NO. : 10/425920
DATED : January 19, 2010
INVENTOR(S) : Price et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 713 days.

Signed and Sealed this

Twenty-third Day of November, 2010

David J. Kappos
*Director of the United States Patent and Trademark Office*